Oct. 16, 1951 P. FARKAS 2,571,432
BRAKE FOR AUTOMOBILE VEHICLES AND THE LIKE
Filed May 27, 1946 4 Sheets-Sheet 1
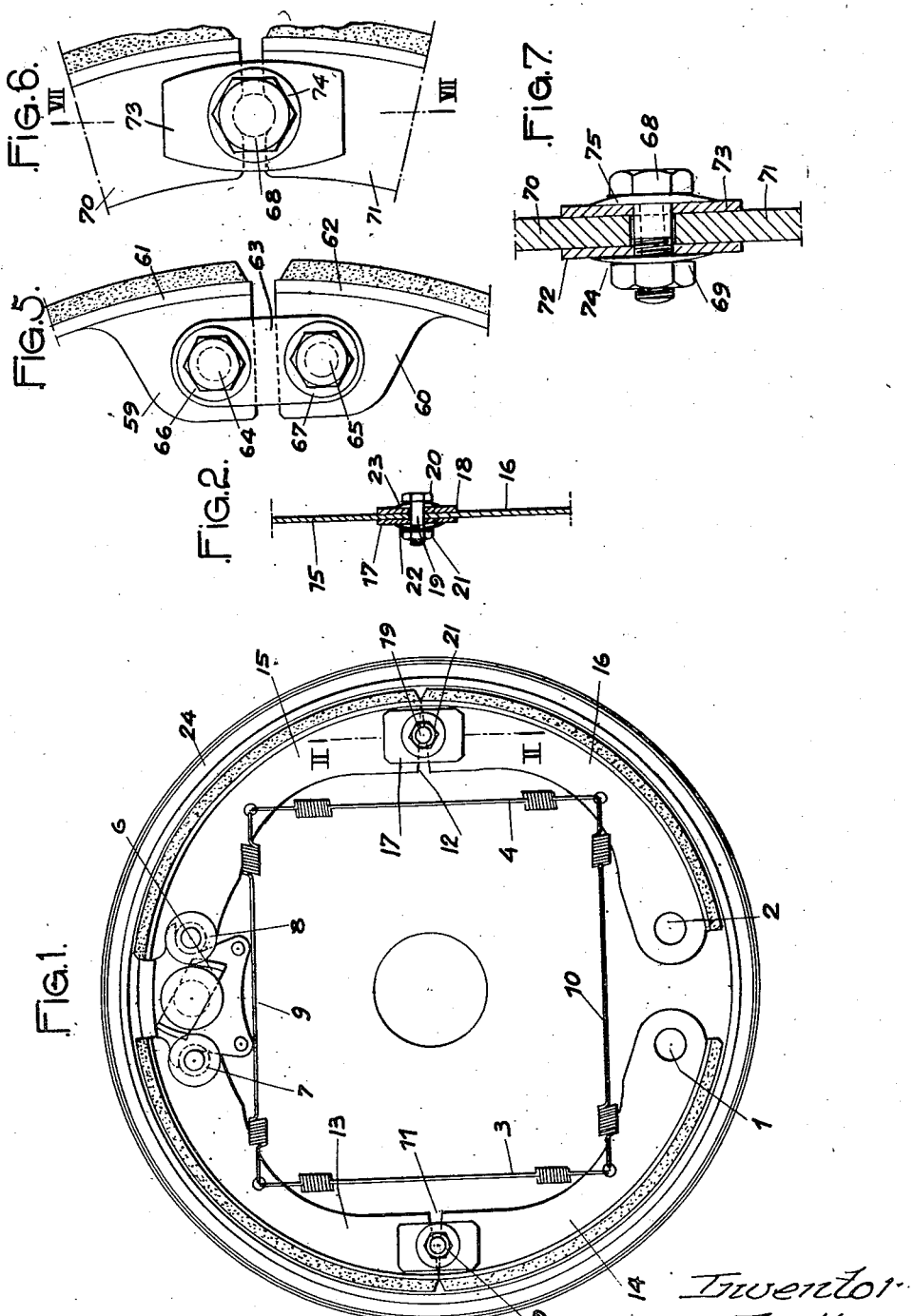
Inventor
Pierre Farkas Oct. 16, 1951     P. FARKAS     2,571,432
BRAKE FOR AUTOMOBILE VEHICLES AND THE LIKE
Filed May 27, 1946     4 Sheets-Sheet 2
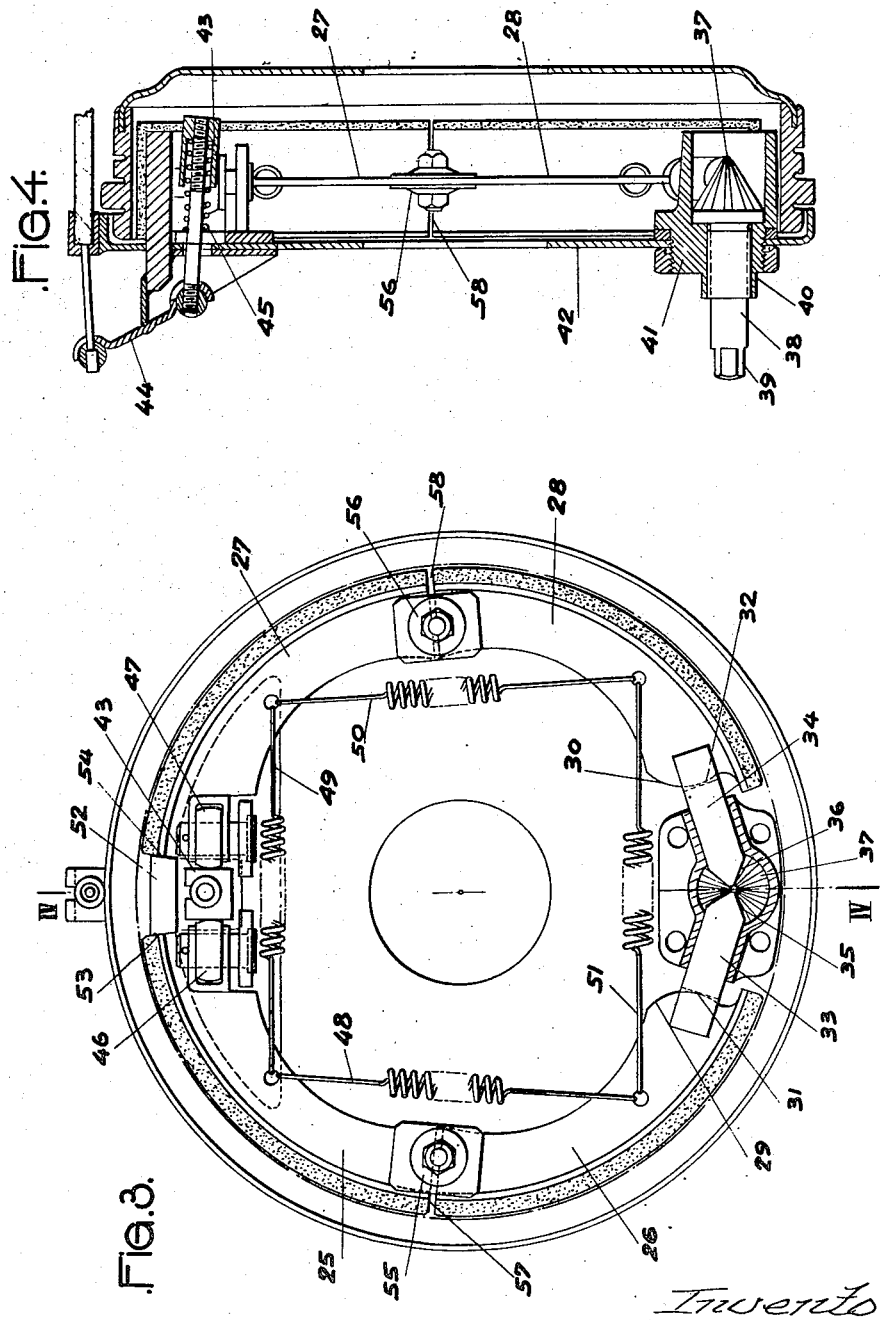

Oct. 16, 1951 P. FARKAS 2,571,432
BRAKE FOR AUTOMOBILE VEHICLES AND THE LIKE
Filed May 27, 1946 4 Sheets-Sheet 3
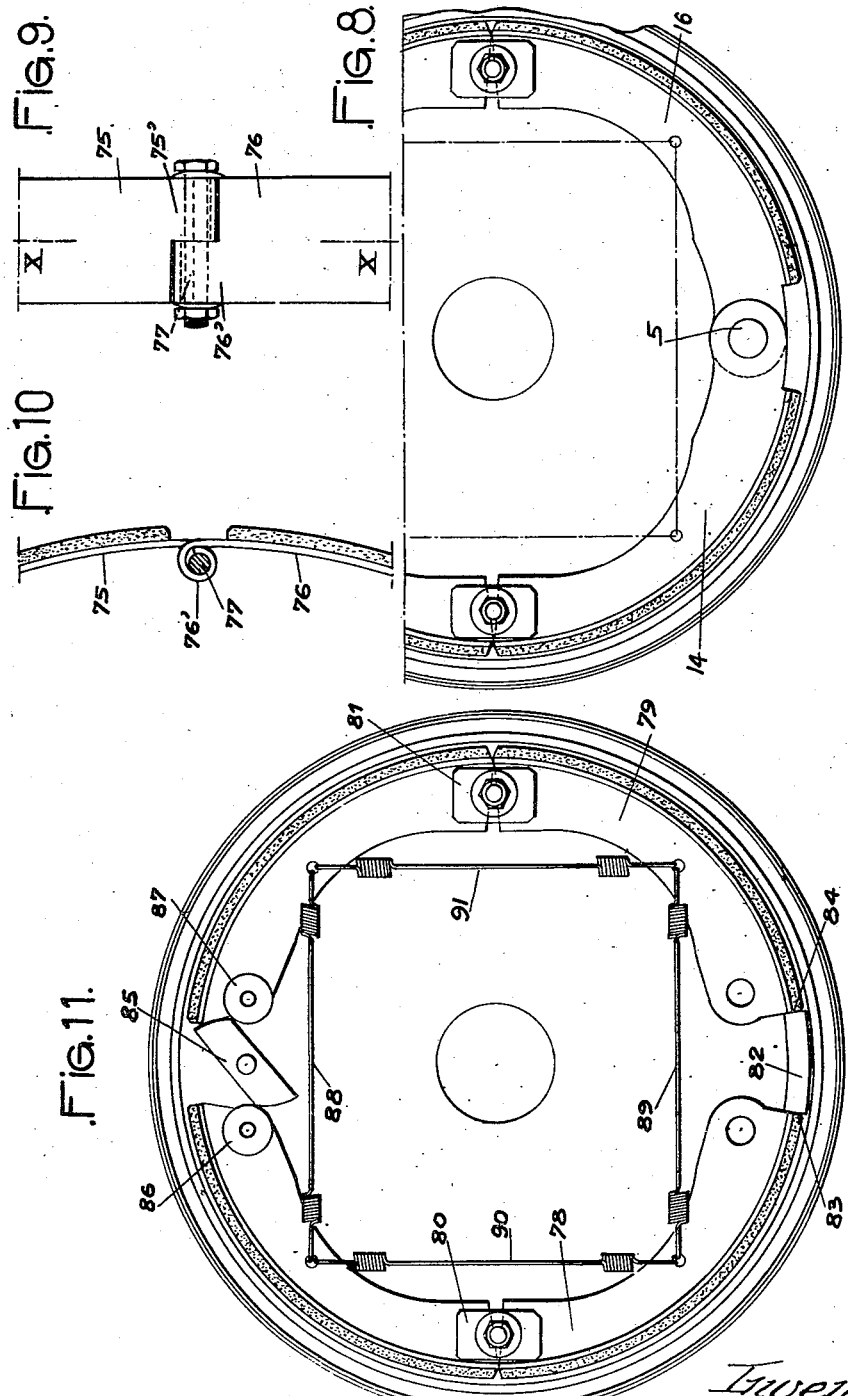

Oct. 16, 1951          P. FARKAS          2,571,432
BRAKE FOR AUTOMOBILE VEHICLES AND THE LIKE
Filed May 27, 1946          4 Sheets-Sheet 4
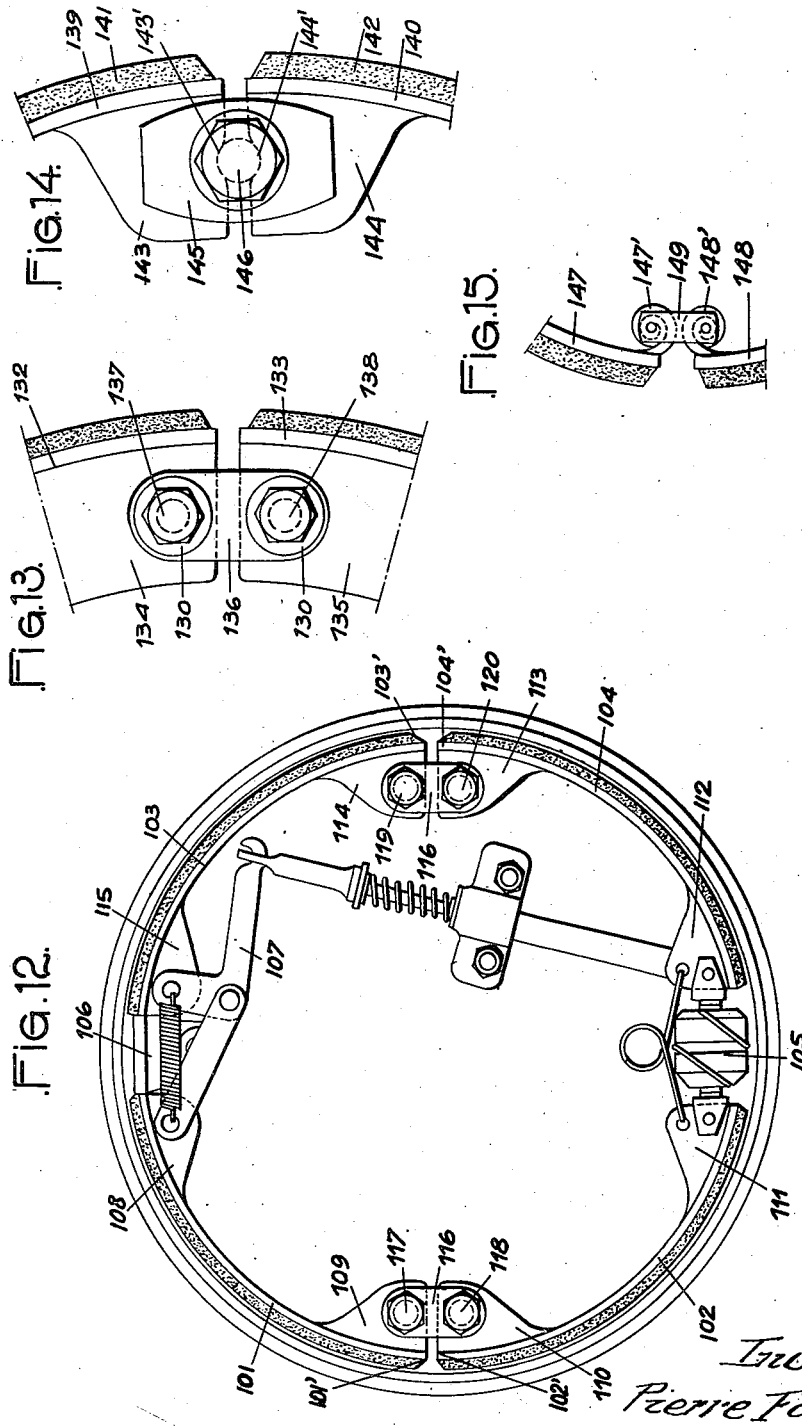

UNITED STATES PATENT OFFICE 2,571,432

BRAKE FOR AUTOMOBILE VEHICLES
AND THE LIKE

Pierre Farkas, Paris, France

Application May 27, 1946, Serial No. 672,515
In France April 27, 1944

Section 1, Public Law 690, August 8, 1946
Patent expires April 27, 1964

4 Claims. (Cl. 188—78)

This invention relates to drum brakes for automobiles and the like, more particularly to such brakes that have segmental shoes.

In brakes of this type, the linings wear in an irregular manner and consequently they only partially and irregularly engage the wall of the drum. In any case, the linings wear so that they do not match the shape of the drum after long use.

To offset this drawback, it has previously been proposed by the present inventor's prior Patent No. 2,146,208, February 7, 1939, to adapt the shoes to conform with, and automatically adjust their position to, the curvature of the drum wall through a gradual modification of their shape in order to accommodate the gradual wear of their linings. This has been effected by slotting the web portions of the shoes to permit bending the sections of the shoes on opposite sides of the slots outwardly toward the drum in accordance with the curvature of the drum. These shoes, while serving the purpose, are not as flexible as desired because they are incapable of any material inward bending of the shoe sections away from the drum.

Having in mind the defects of the prior art devices, it is an object of the present invention to provide a flexible segmental brake shoe that will readily and automatically conform to a brake drum, and will have certainty of operation, simplicity of design and economy of construction.

The foregoing objects and others ancillary thereto are preferably accomplished, according to a preferred embodiment of the invention, by shoes which are provided with slots throughout a portion of the width of the webs thereof and entirely pass through the shoes transversally, so as to subdivide the latter into segments or elements, while elastic members are provided to hold the elements in their relative positions as they are gradually adjusted to conform the shoes with the drum wall. The shoes may be pivotally secured to the brake plate, separately or on a common axis, or the shoes may be pivotally secured to, or pivotally bear on, an adjustable device or a stop member.

According to the preferred form of shoe, the adjustable connection between the shoe segments is constituted by plates positioned on either side of adjacent web portions of the shoe segments and which are releasably connected by a bolt and nut passing between the webs with the interposition of resilient washers. The webs may have straight ends or they may be notched to receive a bolt and form a pivotal connection therewith. In a modified connection, the shoe elements are held apart by the connecting means which are such that the ends of the separate jaw elements remain spaced with reference to one another whatever their relative positioning may be during the automatic adapting operation. Consequently, the modified connection may comprise fish-plates fastened over the webs, or like parts, of the adjacent shoe elements, and a bolt may be located between the ends of these shoe elements in a manner such that these ends do not contact with one another. The fish-plates may be fastened against the webs of the shoe elements by two bolts passing respectively through either web, the openings provided in said plates being sufficiently distant from one another for holding the ends of the two shoe elements spaced apart.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout and in which:

Fig. 1 is a side view in elevation of a brake according to the invention;

Fig. 2 is a fragmentary cross-sectional view taken on line II—II of Fig. 1;

Fig. 3 is a side view in elevation of a modification of the brake;

Fig. 4 is a cross-sectional view taken on line IV—IV of Fig. 3;

Figs. 5 and 6 are fragmentary side views in elevation of modifications of connections between the shoe segments;

Fig. 7 is a cross-sectional view taken on line VII—VII of Fig. 6;

Fig. 8 is a fragmentary side view in elevation showing a modification wherein the two shoes are pivotally secured to a common axis;

Fig. 9 is a rear view in elevation of a modification of the pivotal means between the two segments of a shoe;

Fig. 10 is a cross-sectional view taken on line X—X of Fig. 9.

Fig. 11 is a side view in elevation of a modification of the brake wherein the shoes bear against a stop secured to the brake plate;

Fig. 12 is a side view in elevation of a modification comprising a self-applying brake including segmental shoes in accordance with the invention; and Figs. 13, 14 and 15 are fragmentary side views in elevation of modifications of the connections between the shoe segments.

Referring now to the drawings and specifically to Fig. 1, the brake includes two shoes, each pivotally secured at one end by the pivots 1 and 2 with the brake plate. A spacing device for these shoes is constituted by a cam 6, rotating under the action of a suitable control device and engaging rollers 7, 8 mounted on the opposed ends of the shoes. Springs 9 and 10 bias the shoes toward each other into their inoperative position after actuation of the brake, and compensating springs 4 and 3 equilibrate this return action. The shoes are subdivided into two halves, 13—14 and 15—16 respectively, and adjustable connecting means span the slots 11—12 between said halves. The connecting means are, preferably, constituted by plates 17—18 positioned on either side of the shoe segments 15—16 and resiliently clamped against the webs of said segments by a bolt 19 having a head 20 and provided with a nut 21 and resilient washers 22, 23 interposed therebetween. When the control means are actuated for applying the brake, the cam 6 biases the rollers 7 and 8 apart to expand their respective shoes, which are pivoted on the stationary axes 1 and 2, to bear against the drum 24.

If by reason of the wear of the lining, or for any other reason, the shoes do not bear completely against the drum wall, the shoes are adjusted by a pivoting movement between their segments 13—14 and 15—16, about their contacting points. This pivoting movement is permitted by the yielding action of the washers 22, 23. When the shoes are adjusted to completely contact the surface of the drum, the washers 22—23 act through the agency of the plates 17—18 on the pivoted halves of the jaws so as to hold the latter in adjusted position. The adjustment being thus retained, the entire surface of the shoes will bear against the drum at subsequent actuations of the brake. The connection means thus allows a gradual automatic modification in the shape of the shoes.

Figs. 3 and 4 illustrate a modification wherein the shoes composed of segments 25—26 and 27—28 are pivotally mounted by the abutment of their ends, through the edges 29 and 30 of their webs, against the rectiline bottoms 31 and 32 of slots provided in the adjusting fingers 33—34, the inner ends 35 and 36 of which are beveled or pointed and engage a ribbed cone member 37 carried at the end of a rod 38 provided with an operating part 39. This rod 38 is screwed into a tapping 40 of a sleeve 41 that is mounted in the plate 42. Consequently, the shoes are pivotally secured by means of their webs freely seating within the slots of the fingers which are adjustable on the opposite sides of a stationary point on the axis of the cone 37.

These shoes engage, at their other ends, an operating device including a plug 43 that is drawn by a linkage 44, in opposition to the action of the spring 45, and engaging the rollers 46—47 that are mounted on the ends of the shoes. Springs 48—49—50—51 bias the shoes into their inoperative position upon which their ends engage a stop 52 having radial lateral surfaces 53—54. Connecting devices 55—56, similar to those illustrated in Figs. 1 and 2, overlie the slots 57—58 between the shoe elements 25—26 and 27—28 of the shoes. This brake operates in the same manner as that shown in Figs. 1 and 2, except for the fact that the shoes are pivotally mounted by means of the slots in the fingers 33 and 34.

Instead of subdividing each shoe into two segments, such as 13 and 14 by the slot 11, it is possible to subdivide each shoe into three or more segments which are respectively connected by suitable connecting means such as that previously described. In Figs. 1, 8 and 11, the parts of the shoes held by the connecting means are in contact, i. e. the sections of the shoes separated by the slots remain in contact with one another, preferably at the rim of the shoe. The invention also contemplates the application of other types of connecting means for holding these segments of the jaws in proper relation. Fig. 5 illustrates a modification wherein the lugs 59 and 60, formed at the ends of the shoe segments 61 and 62, are connected to fish-plates 63 which are resiliently clamped against said lugs by bolts 64—65 and spring washers 66 and 67. In another modification, shown in Fig. 6, a single bolt 68, having a nut 69, is fitted within notches in the adjacent ends of the shoe segments 70—71 and extends through fish-plates 72—73 and spring washers 74—75.

The invention also contemplates brakes having shoes mounted on the brake plate in any suitable manner. Thus, in Fig. 8 a modification is illustrated wherein the two shoes 14—16 are pivotally secured through their webs to a common pivot 5 secured to the brake plate, the remainder of the arrangement being the same shown in Fig. 1. Figs. 9 and 10 illustrate a further modification wherein the rims 75 and 76 have their ends, through half their width, coiled to form two sleeves 75', 76' which are mounted in axial alignment on a bolt 77, secured to the brake plate, and said sleeves may be held yieldingly compressed in the direction of their axes.

Fig. 11 shows a further modification wherein the shoes 78—79 subdivided into two segments that are connected by connecting means 80—81 as hereinbefore disclosed, pivotally bear against a stop 82 secured to the brake plate. This stop is provided with rectilinear surfaces 83 and 84 which, preferably, are radial. The actuation of said shoes may be performed in any known manner, as by means of a spanner 85 acting on the rollers 86—87 carried by the ends of the shoes. Springs 88—89, 90—91 resiliently bias the shoes to inoperative position after braking and for the compensation of the stresses.

Fig. 12 shows a self-applying brake including four shoe elements 101, 102, 103, 104, with an adjustable support 105, a stop 106 and a spacing mechanism 107. In the example illustrated each of the shoe elements includes a rim and its lining, together with lugs 108—109, 110—111, 112—113 and 114—115 at each end for securing and adjusting the shoes, said lugs being formed of desired by a fold or flange of the rim or by an independent member secured thereto. The ends 101'—102' and 103'—104', of the shoe elements are spaced relative to each other. These shoe elements are connected by fish-plates 116, located to either side of the lugs 109—110 and 114—113 and are then fastened over each lug by pivotal members 117, 118, 119, 120. These pivotal members may comprise, for instance, bolts to be locked by means of nuts.

With this arrangement, the two shoe elements 101 and 102 on one hand and 103 and 104 on the other may be adjusted automatically with reference to one another by pivoting round their axes 117—118 and 119—120. The fastening system constituted by the two fish-plates clamped against the lugs 109—110 and 113—114 of these shoe elements permanently holding the segments in their adjusted positions. It should be noted that these connecting members operate with the ends 101', 102' and 103', 104' of the shoe elements spaced from each other rather than being in contact as in the case of the previously described brakes of this type.

In the modification of Fig. 13, the two shoes 132—133 are provided with webs 134—135 rather than lugs and the webs are connected through two fish-plates 136 fastened by bolts 137—138 which act as pivotal axes. In Fig. 14 the two adjacent shoe elements 139 and 140, with their linings 141 and 142, are provided with lugs 143—144 having semi-circular recesses 143'—144'. These lugs are connected by fish-plates 145 clamped by a bolt 146 forming a pivoting axis and extending through the opening defined by said recesses.

Fig. 15 shows a modification wherein the rims 147—148 of the two adjacent shoe elements are provided at their ends with coils 147'—148' to which are secured the fish-plates 149 by bolts extending axially through said coils. The rolled coils 147'—148' may have one or more convolutions and may be cut out of the ends of the webs so as to correspond only to a part of the width of the latter, the fish-plates and like assembling and connecting members lying thus within the width of the shoe itself.

Lastly, by way of a modification shown in Fig. 15, the separate coils 147', 148' may be welded or secured in any other suitable manner to the ends of the shoes 147—148 for receiving the fish plates and clamping means.

Obviously the shoes may be of any suitable type. For instance they may include webs as in the case of the structures shown in Figs. 1 to 4, 6 and 13 or only lugs as shown in Figs. 5, 12 and 14. In all cases, however, the shoe elements, whether they are held in contact with one another, as in the case of Figs. 1, 8 and 11, or else spaced from each other as in the case of Figs. 3 to 7 and 12 to 15; are held tightly by the connecting means in the relative position they assume automatically during the braking action as they bear against the drum wall.

Certain modifications may also be relative to the connecting means. In particular, the bolt and the nut may be replaced by any other equivalent connecting device. The connecting means may comprise an elastic washer, a spring or a mere rubber member held fast by a bolt or the like with or without a bearing plate. The pivotal axis or axes may be placed either, as illustrated, towards the inside of the web or of the lugs on the shoe elements or at any suitable point in the width of said web or said lugs. Moreover, the locking of the fish-plates may be obtained by any suitable means.

Lastly, my invention is applicable to brakes including any number of shoe elements, say 6 or 8 elements instead of 4 as illustrated in Fig. 1 and also to brakes provided with any mechanical, hydraulic or pneumatic means for spacing, operating and adjusting them. It should be noted that the shoe elements, according to invention, are interchangeable and may be fabricated in a single type, to permit mass production and to interchange parts to facilitate repair.

Although a certain specific embodiment of the invention has been shown and described, it is obvious that many modifications thereof are possible. The invention, therefore, is not to be restricted except insofar as is necessitated by the prior art and by the spirit of the appended claims.

Having thus described my invention, what I claim and desire to secure by Letters Patent is:

1. A brake shoe for use with brake drums, comprising a plurality of individual segments which are arranged in end-to-end alignment, each of said segments having curved brake shoe portions, pivotal portions on their adjacent ends, and means pivotally connecting the pivotal portions of adjacent segments and elastically urged for frictionally clamping said segments in alignment but permitting angular adjustment therebetween to adapt it to conform to a brake drum to which the shoe is fitted, the adjacent pivotal portions of said segments being spaced apart to permit relative angular adjustment of said segments about said pivot means in either direction while substantially maintaining the relative longitudinal positions of said brake shoe portions.

2. A brake shoe for use with brake drums, comprising a plurality of individual segments which are arranged in end-to-end alignment, each of said segments having curved brake shoe portions with radially extending web portions adjacent their adjoining ends, pivotal portions on the adjacent ends of the web portions of adjacent segments, and means pivotally connecting the pivotal portions and spanning the adjacent web portions and including elastic means for frictionally clamping said segments in alignment but permitting angular adjustment therebetween to adapt it to conform to a brake drum to which the shoe is fitted, the adjacent pivotal portions on the ends of said web portions being spaced apart to permit relative angular adjustment of said segments about said pivot means in either direction while substantially maintaining the relative longitudinal positions of said brake shoe portions.

3. A brake shoe for use with brake drums, comprising a plurality of individual segments which are arranged in end-to-end alignment, each of said segments having curved brake shoe portions with radially extending web portions adjacent their adjoining ends, pivot means for the adjacent ends of the web portions of adjacent segments, and means mounted on said pivot means and spanning the adjacent web portions and including elastic means for frictionally clamping said segments in alignment but permitting angular adjustment therebetween to adapt it to conform to a brake drum to which the shoe is fitted, the adjacent ends of said shoe portions being in fulcrum abutment and the adjacent ends of said web portions being inclined to the radius of the curvature of the shoe so that said web ends are relatively tapered apart to permit relative angular adjustment of said segments about their fulcrum abutment in either direction while substantially maintaining the relative longitudinal positions of said brake shoe portions.

4. A brake shoe as defined in claim 1, including spring means connected between said segments and biasing said segments toward each other to retract the segments from a juxtaposed drum.

PIERRE FARKAS.

REFERENCES CITED

The following references are of record in the file of this patent:

UNITED STATES PATENTS

| Number | Name | Date |
| --- | --- | --- |
| 2,146,208 | Farkas | Feb. 7, 1939 |
| 2,207,172 | Goepfrich | July 9, 1940 |
| 2,418,848 | Perrot | Apr. 15, 1948 |